United States Patent
Raichelgauz et al.

(10) Patent No.: US 9,672,217 B2
(45) Date of Patent: *Jun. 6, 2017

(54) SYSTEM AND METHODS FOR GENERATION OF A CONCEPT BASED DATABASE

(71) Applicant: Cortica, Ltd., Tel Aviv (IL)

(72) Inventors: Igal Raichelgauz, New York, NY (US); Karina Odinaev, New York, NY (US); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,694

(22) Filed: Mar. 10, 2015

(65) Prior Publication Data

US 2015/0186405 A1    Jul. 2, 2015

Related U.S. Application Data

(63) Continuation of application No. 13/766,463, filed on Feb. 13, 2013, now Pat. No. 9,031,999, which is a (Continued)

(30) Foreign Application Priority Data

Oct. 26, 2005 (IL) .......................... 171577
Jan. 29, 2006 (IL) .......................... 173409
Aug. 21, 2007 (IL) .......................... 185414

(51) Int. Cl.
*G06F 7/00* (2006.01)
*G06F 17/30* (2006.01)

(52) U.S. Cl.
CPC .... *G06F 17/30156* (2013.01); *G06F 17/3002* (2013.01); *G06F 17/30023* (2013.01); (Continued)

(58) Field of Classification Search
None
See application file for complete search history.

(56) References Cited

U.S. PATENT DOCUMENTS 4,733,353 A   3/1988  Jaswa
4,932,645 A   6/1990  Schorey et al.
(Continued)

FOREIGN PATENT DOCUMENTS

WO    0231764        4/2002
WO    03005242 A1    1/2003
(Continued)

OTHER PUBLICATIONS

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
(Continued)

*Primary Examiner* — Uyen Le
(74) *Attorney, Agent, or Firm* — M&B IP Analysts, LLC

(57) ABSTRACT

A system and method for generating a concept database based on at least two multimedia data elements (MMDEs). The method includes: generating at least two items from a received MMDE of the at least two MMDEs; determining the items that are of interest for signature generation; generating at least one signature responsive to at least one item of interest of the received MMDE; clustering at least two signatures received from the signature generator responsive of the plurality of MMDEs; reducing the number of signatures in each cluster to a create a signature reduced cluster (SRC) of the cluster; associating metadata with the SRC to a concept structure including at least two SRCs and their associated metadata; and generating at least one index for mapping the received MMDE to at least one concept
(Continued)

structure, wherein the concept database includes concept structures and the generated indices for the at least two MMDEs.

21 Claims, 7 Drawing Sheets

Related U.S. Application Data continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603, 123 is a continuation-in-part of application No. 12/348,888, filed on Jan. 5, 2009, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009.

(52) U.S. Cl.
CPC .. *G06F 17/30321* (2013.01); *G06F 17/30598* (2013.01); *Y10S 707/99943* (2013.01); *Y10S 707/99948* (2013.01)

(56) References Cited

U.S. PATENT DOCUMENTS

| | | |
|---|---|---|
| 4,972,363 A | 11/1990 | Nguyen et al. |
| 5,307,451 A | 4/1994 | Clark |
| 5,568,181 A | 10/1996 | Greenwood et al. |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 6,038,560 A | 3/2000 | Wical |
| 6,052,481 A | 4/2000 | Grajski et al. |
| 6,076,088 A | 6/2000 | Paik et al. |
| 6,122,628 A | 9/2000 | Castelli et al. |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,560,597 B1 | 5/2003 | Dhillon et al. |
| 6,594,699 B1 | 7/2003 | Sahai et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,754,435 B2 | 6/2004 | Kim |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 7,006,689 B2 | 2/2006 | Kasutani |
| 7,013,051 B2 | 3/2006 | Sekiguchi et al. |
| 7,043,473 B1 | 5/2006 | Rassool et al. |
| 7,124,149 B2 | 10/2006 | Smith et al. |
| 7,199,798 B1 | 4/2007 | Echigo et al. |
| 7,260,564 B1 | 8/2007 | Lynn et al. |
| 7,277,928 B2 | 10/2007 | Lennon |
| 7,296,012 B2 | 11/2007 | Ohashi |
| 7,302,117 B2 | 11/2007 | Sekiguchi et al. |
| 7,313,805 B1 | 12/2007 | Rosin et al. |
| 7,346,629 B2 | 3/2008 | Kapur et al. |
| 7,392,238 B1 | 6/2008 | Zhou et al. |
| 7,406,459 B2 | 7/2008 | Chen et al. |
| 7,450,740 B2 | 11/2008 | Shah et al. |
| 7,523,102 B2 | 4/2009 | Bjarnestam et al. |
| 7,526,607 B1 | 4/2009 | Singh et al. |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2* | 8/2009 | Kawai ............... G06Q 10/107 |
| 7,657,100 B2 | 2/2010 | Gokturk et al. |
| 7,660,468 B2 | 2/2010 | Gokturk et al. |
| 7,694,318 B2 | 4/2010 | Eldering et al. |
| 7,836,054 B2* | 11/2010 | Kawai ............... G06Q 10/107 |
| | | 707/626 |
| 7,920,894 B2 | 4/2011 | Wyler |
| 7,921,107 B2 | 4/2011 | Chang et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,316,005 B2 | 11/2012 | Moore |

(56) References Cited

U.S. PATENT DOCUMENTS

| | | |
|---|---|---|
| 8,326,775 B2 | 12/2012 | Raichelgauz et al. |
| 8,345,982 B2 | 1/2013 | Gokturk et al. |
| 8,548,828 B1 | 10/2013 | Longmire |
| 8,655,801 B2 | 2/2014 | Raichelgauz et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichquaz et al. |
| 8,818,916 B2 | 8/2014 | Raichelgauz et al. |
| 8,868,619 B2 | 10/2014 | Raichelgauz et al. |
| 8,880,539 B2 | 11/2014 | Raichelgauz et al. |
| 8,880,566 B2 | 11/2014 | Raichelgauz et al. |
| 8,886,648 B1 * | 11/2014 | Procopio ........... G06F 17/30663 707/737 |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,330,189 B2 | 5/2016 | Raichelgauz et al. |
| 9,438,270 B2 | 9/2016 | Raichelgauz et al. |
| 2001/0019633 A1 | 9/2001 | Tenze et al. |
| 2001/0056427 A1 | 12/2001 | Yoon et al. |
| 2002/0019881 A1 | 2/2002 | Bokhari et al. |
| 2002/0038299 A1 | 3/2002 | Zernik et al. |
| 2002/0059580 A1 | 5/2002 | Kalker et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129296 A1 | 9/2002 | Kwiat et al. |
| 2002/0143976 A1 | 10/2002 | Barker et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0131884 A1 | 6/2005 | Gross et al. |
| 2005/0144455 A1 | 6/2005 | Haitsma |
| 2005/0177372 A1 | 8/2005 | Wang et al. |
| 2005/0238238 A1 | 10/2005 | Xu et al. |
| 2005/0245241 A1 | 11/2005 | Durand et al. |
| 2005/0281439 A1 | 12/2005 | Lange |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0224529 A1 | 10/2006 | Kermani |
| 2006/0236343 A1 | 10/2006 | Chang |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0038608 A1 | 2/2007 | Chen |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0091106 A1 | 4/2007 | Moroney |
| 2007/0130112 A1 | 6/2007 | Lin |
| 2007/0130159 A1 | 6/2007 | Gulli et al. |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0152231 A1 | 6/2008 | Gokturk et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0037408 A1 | 2/2009 | Rodgers |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0245573 A1 | 10/2009 | Saptharishi et al. |
| 2009/0245603 A1 | 10/2009 | Koruga et al. |

(56) References Cited

U.S. PATENT DOCUMENTS

| | | |
|---|---|---|
| 2009/0253583 A1 | 10/2009 | Yoganathan |
| 2009/0277322 A1 | 11/2009 | Cai et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0089248 A1 | 4/2013 | Remiszewski et al. |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0147829 A1 | 5/2014 | Jerauld |
| 2014/0176604 A1 | 6/2014 | Venkitaraman et al. |
| 2014/0188786 A1 | 7/2014 | Raichelgauz et al. |
| 2014/0310825 A1 | 10/2014 | Raichelgauz et al. |
| 2015/0289022 A1 | 10/2015 | Gross |

FOREIGN PATENT DOCUMENTS

| | | |
|---|---|---|
| WO | 2004019527 A1 | 3/2004 |
| WO | WO2007049282 | 5/2007 |
| WO | 2014137337 A1 | 9/2014 |
| WO | 2016040376 A1 | 3/2016 |

OTHER PUBLICATIONS

Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.

Lin, et al., "Robust Digital Signature for Multimedia Authentication: A Summary", IEEE Circuits and Systems Magazine, 4th Quarter 2003, pp. 23-26.

Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP2009.4960375, IEEE Conference Publications, Arizona.

Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MIMSP.2012.6343465, Czech Republic.

Guo et al, "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

Boari et al, "Adaptive Routing for Dynamic Applications in Massively Parallel Architectures", 1995 IEEE, Spring 1995.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al., "Feed-forward Echo State Networks"; Proceedings of International Joint Conference on Neural Networks, Montreal, Canada, Jul. 31-Aug. 4, 2005; Entire Document.

Cococcioni, et al, "Automatic Diagnosis of Defects of Rolling Element Bearings Based on Computational Intelligence Techniques", University of Pisa, Pisa, Italy, 2009.

Emami, et al., "Role of Spatiotemporal Oriented Energy Features for Robust Visual Tracking in Video Surveillance, University of Queensland", St. Lucia, Australia, 2012.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan, et al. "Content-Based Retrieval of Music and Audio", 1997 Institute of Systems Science, National University of Singapore, Singapore (Abstract).

Freisleben et al., "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Howlett et al., "A Multi-Computer Neural Network Architecture in a Virtual Sensor System Application", International Journal of Knowledge-based Intelligent Engineering Systems, 4 (2). pp. 86-93, 133N 1327-2314.

International Search Authority: "Written Opinion of the International Searching Authority" (PCT Rule 43bis.1) including International Search Report for International Patent Application No. PCT/US2008/073852; Date of Mailing: Jan. 28, 2009.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

International Search Report for the corresponding International Patent Application PCT/IL2006/001235; Date of Mailing: Nov. 2, 2008.

IPO Examination Report under Section 18(3) for corresponding UK application No. GB1001219.3, dated Sep. 12, 2011.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251 German National Research Center for Information Technology.

Lin, C.; Chang, S.: "Generating Robust Digital Signature for ImageNideo Authentication", Multimedia and Security Workshop at ACM Mutlimedia '98; Bristol, U.K., Sep. 1998; pp. 49-54.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

(56) References Cited

OTHER PUBLICATIONS

Maass, W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Ortiz-Boyer et al., "CIXL2: A Crossover Operator for Evolutionary Algorithms Based on Population Features", Journal of Artificial Intelligence Research 24 (2005), pp. 1-48 Submitted Nov. 2004; published Jul. 2005.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.
Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002; Entire Document.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.

Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Brecheisen, et al., "Hierarchical Genre Classification for Large Music Collections", ICME 2006, pp. 1385-1388.
Chuan-Yu Cho, et al., "Efficient Motion-Vector-Based Video Search Using Query by Clip", 2004, IEEE, Taiwan, pp. 1-4.
Gomes et al., "Audio Watermaking and Fingerprinting: For Which Applications?" University of Rene Descartes, Paris, France, 2003.
Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and 3rowsing", IEEE, vol. 13, No. 7, Jul. 2004, pp. 1-19.
Nam, et al., "Audio Visual Content-Based Violent Scene Characterization", Department of Electrical and Computer Engineering, Minneapolis, MN, 1998, pp. 353-357.
Shih-Fu Chang, et al., "VideoQ: A Fully Automated Video Retrieval System Using Motion Sketches", 1998, IEEE, , New York, pp. 1-2.
Wei-Te Li et al., "Exploring Visual and Motion Saliency for Automatic Video Object Extraction", IEEE, vol. 22, No. 7, Jul. 2013, pp. 1-11.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
May et al., "The Transputer", Springer-Verlag, Berlin Heidelberg, 1989, teaches multiprocessing system.
Vailaya, et al., "Content-Based Hierarchical Classification of Vacation Images," I.E.E.E: Multimedia Computing and Systems, vol. 1, 1999, East Lansing, MI, pp. 518-523.
Vallet, et al., "Personalized Content Retrieval in Context Using Ontological Knowledge," IEEE Transactions on circuits and Systems for Video Technology, vol. 17, No. 3, Mar. 2007, pp. 336-346.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM.2015.7314122 IEEE Conference Publications.
Wilk, et al., "The Potential of Social-Aware Multimedia Prefetching on Mobile Devices", 2015 International Conference and Workshops

(56) References Cited

OTHER PUBLICATIONS on Networked Systems (NetSys) Year: 2015, pp. 1-5, DOI: 10.1109/NetSys.2015.7089081 IEEE Conference Publications.
The International Search Report and the Written Opinion for PCT/US2016/054634 dated 16 Mar. 2017, ISA/RU, Moscow, RU.

* cited by examiner

SYSTEM AND METHODS FOR GENERATION OF A CONCEPT BASED DATABASE

CROSS-REFERENCE TO RELATED APPLICATIONS

This application is a continuation of U.S. patent application Ser. No. 13/766,463 filed on Feb. 13, 2013, now U.S. Pat. No. 9,031,999. The Ser. No. 13/766,463 Application is a continuation-in-part of U.S. patent application Ser. No. 13/602,858 filed on Sep. 4, 2012, now U.S. Pat. No. 8,868,619. The Ser. No. 13/602,858 Application is a continuation of U.S. patent application Ser. No. 12/603,123 filed on Oct. 21, 2009, now U.S. Pat. No. 8,266,185. The Ser. No. 12/603,123 Application is a continuation-in-part of:
 (1) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005 and Israeli Application No. 173409 filed on Jan. 29, 2006;
 (2) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150;
 (3) U.S. patent application Ser. No. 12/348,888 filed on Jan. 5, 2009, now pending, which is a continuation-in-part of the above-referenced U.S. patent application Ser. No. 12/084,150 and the above-referenced U.S. patent application Ser. No. 12/195,863; and
 (4) U.S. patent application Ser. No. 12/538,495 filed on Aug. 10, 2009, now U.S. Pat. No. 8,312,031, which is a continuation-in-part of the above-referenced U.S. patent application Ser. No. 12/084,150, the above-referenced U.S. patent application Ser. No. 12/195,863, and the above-referenced U.S. patent application Ser. No. 12/348,888.

All of the applications referenced above are herein incorporated by reference.

TECHNICAL FIELD

The disclosure relates generally to content-management and search engines, and more particularly relates to the collection, clustering and creation of concept structures of multimedia data elements and creating a concept based database respective thereto.

BACKGROUND

With the abundance of multimedia data made available through various means in general and the Internet and world-wide-web (WWW) in particular, there is a need for effective ways of searching for, and management of such multimedia data. Searching, organizing, and managing multimedia data in general and video data in particular may be challenging at best due to the difficulty of representing and comparing the information embedded in the video content, and due to the scale of information that needs to be checked. Moreover, when it is necessary to find a content of video by means of textual query, prior art cases revert to various metadata solutions that textually describe the content of the multimedia data. However, such content may be abstract and complex by nature and not necessarily adequately defined by the existing and/or attached metadata.

The rapid increase in multimedia databases, accessible for example through the Internet, calls for the application of new methods of representation of information embedded in video content. Searching for multimedia in general and for video data in particular is challenging due to the huge amount of information that has to be priority indexed, classified and clustered. Moreover, prior art techniques revert to model-based methods to define and/or describe multimedia data. However, by its very nature, the structure of such multimedia data may be too abstract and/or complex to be adequately represented by means of metadata. The difficulty arises in cases where the target sought for multimedia data is not adequately defined in words, or by respective metadata of the multimedia data. For example, it may be desirable to locate a car of a particular model in a large database of video clips or segments. In some cases the model of the car would be part of the metadata but, in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "the Architecture") that is based on a PCT patent application publication number WO2007/049282 and published on May 3, 2007, entitled "A Computing Device, a System and a Method for Parallel Processing of Data Streams", assigned to common assignee, is hereby incorporated by reference for all the useful information it contains. Generally, the Architecture consists of a large ensemble of randomly, independently generated, heterogeneous processing cores, mapping in parallel data-segments onto a high-dimensional space and generating compact signatures for classes of interest.

Searching multimedia data has been a challenge of past years and has therefore received considerable attention. Early systems would take a multimedia data element in the form of, for example, an image, compute various visual features from it, and then search one or more indexes to return images with similar features. In addition, values for these features and appropriate weights reflecting their relative importance could also be used. Searching and indexing techniques have improved over time to handle various types of multimedia inputs and handle them with ever increasing effectiveness. However, subsequent to the exponential growth of the use of the Internet and the multimedia data available there, these prior art systems have become less effective in handling the multimedia data, due to the vast amounts already existing, as well as the speed at which new ones are added.

Searching has therefore become a significant challenge and even the addition of metadata to assist in the search has limited functionality. First, metadata may be inaccurate or not fully descriptive of the multimedia data, and second, not every piece of multimedia data can be accurately enough described by a sequence of textual metadata. A query model for a search engine has some advantages, such as comparison and ranking of images based on objective visual features, rather than on subjective image annotations. However, the query model has its drawbacks as well. Certainly when no metadata is available and only the multimedia data needs to be used, the process requires significant effort. Those skilled in the art will appreciate that there is no known intuitive way of describing multimedia data. Therefore, a large gap may be found between a user's perception or conceptual understanding of the multimedia data and the way it is actually stored and manipulated by a search engine.

Current generation of web applications have become more and more effective at aggregating massive amounts of data of different multimedia content, such as, pictures, videos, clips, paintings and mash-ups, and are capable of slicing and dicing it in different ways, as well as searching it and displaying it in an organized fashion, by using, for example, concept networks. A concept may enable understanding of a multimedia data from its related content. However, current art is unable to add any real "intelligence" to the mix, i.e., no new knowledge is extracted from the multimedia data that are aggregated by such systems. Moreover, the systems tend to be non-scalable due to the vast amounts of data they have to handle. This, by definition, hinders the ability to provide high quality searching for multimedia content.

There is therefore a need in the art to overcome the deficiencies of the prior art solutions and to provide the building element for a search engine for content-management of multimedia data that is intelligent, effective, and scalable.

SUMMARY

Some embodiments disclosed herein include a system for generating a concept database respective of a plurality of multimedia data elements. The system comprises an attention processor (AP) for generating a plurality of items from a received MMDE of the plurality of MMDEs and determining which of the generated items are of interest for signature generation; a signature generator (SG) for generating at least one signature responsive to at least one item of interest of the received MMDE of the plurality of MMDEs; a clustering processor (CP) for clustering a plurality of signatures received from the signature generator responsive of the plurality of MMDEs and creating a signature reduced cluster (SRC); a concept generator (CG) for associating metadata with the SRC and forming a concept structure comprised of a plurality of SRCs and their associated metadata, wherein the CG is further configured to: generate metadata for each signature of the plurality of signatures, compare the generated metadata to metadata associated with each SRC of the plurality of SRCs to determine if there is a match, associate the SRC with the matching SRCs of the plurality of SRCs, upon determining that there is a match; and an index generator (IG) for generating at least one index for mapping the received MMDE to the at least one concept structure formed by the CG, wherein the at least concept structures and the at least one generated index are stored in the concept database.

Some embodiments disclosed herein include a method for generating a concept database respective of a plurality of multimedia data elements. The method comprises generating a plurality of items from a received MMDE of the plurality of MMDEs; determining the items that are of interest for signature generation; generating at least one signature responsive to at least one item of interest of the received MMDE of the plurality of MMDEs; clustering a plurality of signatures received from the signature generator responsive of the plurality of MMDEs; reducing the number of signatures in each cluster to a create a signature reduced cluster (SRC) of the cluster; associating metadata with the SRC to a concept structure comprised of a plurality of SRCs and their associated metadata, wherein the associating further comprises: generating metadata for each signature of the plurality of signatures, comparing the generated metadata to metadata associated with each SRC of the plurality of SRCs to determine if there is a match, upon determining that there is a match, associating the SRC with the matching SRCs of the plurality of SRCs; generating at least one index for mapping the received MMDE to the at least one concept structure; and storing the at least one concept structure and the at least one generated index in the concept database.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
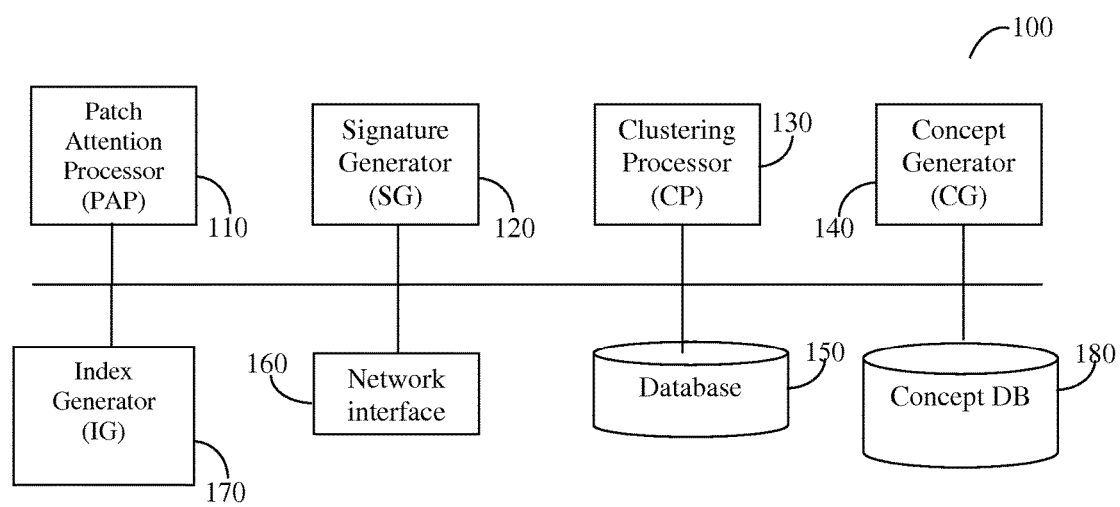
FIG. 1 is a diagram of a DCC system for creating concept structures in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A large-scale web-platform for a multimedia deep-content-classification (DCC) system configured to continuously create a knowledge database for multimedia data can be utilized to achieve the embodiments disclosed herein. The DCC system initially receives a large number of multimedia data elements (MMDEs) to create a knowledge base that is condensed into concept structures that are efficient to store, retrieve and check for matches. As new MMDEs are collected, they are efficiently added to the knowledge base and concept structures, such that the computing resources requirement for achieving this operation is generally sub-linear rather than linear or exponential. The DCC system extracts patterns from each MMDE and selects the important/salient patterns for the creation of signatures thereof. A process of inter-matching between the patterns found by clustering, is followed by reduction in the number of signatures in a cluster to a minimum that maintains matching and enables generalization to new MMDEs. Metadata respective of the MMDEs is thereby produced, forming together with the reduced clusters into a concept structure.

According to various embodiments disclosed herein, a concept database (DB) is populated. The concept-based DB indexes multimedia data elements (MMDEs) into concept structures. Each new MMDE is mapped to the concept DB which creates a set of indices. The indices of the elements are stored, while the raw data may be deleted or saved for future uses.

According to one embodiment, the concept DB is comprised of two layers: (a) a concept structures database; and (b) a database of indices of original MMDEs mapped to the concept structures-database. The architecture of the concept DB enables an external system to perform content-management operations on the indices database because the volume of the indices is lower and, thus, the analysis requires fewer computational resources. All the necessary updates are performed by adding, removing, or updating the concept structures in the concept DB.

FIG. 1 shows an exemplary and non-limiting diagram of a DCC system 100 for creating concept structures. The DCC system 100 receives multimedia data elements (MMDEs) from, for example, the Internet via a network interface 160. The MMDEs may include, but are not limited to, images, graphics, video streams, video clips, audio streams, audio clips, video frames, photographs, images of signals, combinations thereof, and portions thereof. The images of signals are images such as, but not limited to, medical signals, geophysical signals, subsonic signals, supersonic signals, electromagnetic signals, infrared signals, and combinations thereof.

The MMDEs may be stored in a database (DB) 150, and references to the MMDEs are kept in the DB 150 for future retrieval of the respective multimedia data element. Such a reference may be, but is not limited to, a universal resource locator (URL).

Every MMDE in the DB 150, or referenced therefrom, is then processed by a patch attention processor (PAP) 110, thereby resulting in a plurality of patches that are of specific interest, or otherwise of higher interest than other patches. A more general pattern extraction, such as an attention processor (AP) can also be used in lieu of patches. The AP receives the MMDE that is partitioned into items. An item may be an extracted pattern or a patch, or any other applicable partition depending on the type of the MMDE. The functions of the PAP 110 are described herein below in more detail. Those patches that are of higher interest are then used by a signature generator (SG) 120 to generate signatures respective of the patch. The operation of the SG 120 is described in more detail herein below.

A clustering processor (CP) 130 initiates a process of inter-matching of the signatures upon determining that there are a number of patches above a predefined threshold. The threshold may be defined to be large enough to enable proper and meaningful clustering. With a plurality of clusters, a process of clustering reduction takes place so as to extract the most useful data about the cluster and keep it at an optimal size to produce meaningful results. The process of cluster reduction is continuous. When new signatures are provided after the initial phase of the operation of the CP 130, the new signatures may be immediately checked against the reduced clusters to save on the operation of the CP 130. A more detailed description of the operation of the CP 130 is provided herein below.

A concept generator (CG) 140 operates to create concept structures from the reduced clusters provided by the CP 130. Each concept structure is comprised of a plurality of metadata associated with the reduced clusters. The result is a compact representation of a concept that can now be easily compared against a MMDE to determine if the received MMDE matches a concept structure stored, for example, in the DB 150. This matching operation can be performed by the CG 140, for example, and without limitation, by providing a query to the DCC system 100 for finding a match between a concept structure and a MMDE. A more detailed description of the operation of the CG 140 is provided herein below.

An index generator (IG) 170 is configured to extract metadata related to each of the plurality of MMDEs stored in the DB 150 or referenced therefrom. The metadata may include patches created by the PAP 110 for each MMDE. The metadata may also include one or more signatures generated by the SG 120 for each MMDE. The metadata may further include the concept structure identified for reach of the MMDE. Based on the metadata extracted, the IG 170 is configured to generate a plurality of compressed conceptual representations, which will be referred to as indices, for each of the plurality of MMDEs stored in the DB 150 or referenced therefrom.

In one embodiment, an index for a MMDE is generated by matching its respective metadata to a plurality of concept structures provided by the CG 140. Upon at least one matching concept structure being detected, an index to the matching structure is generated. For example, an image of tulip would be mapped to a concept structure of flowers.

The plurality of indices is then stored in a concept DB 180 also included in the DDC system 100. The content management operations, such as but not limited to, data retrieval, search, and so on are performed using the indices saved in the concept DB 180. In certain configurations, the concept DB 180 may be part of the DB 150.

According to one embodiment, the concept DB 180 includes two layers of data structures (or databases): one is for the concept structures and the other is for the indices of original MMDEs mapped to the concept structures in the concept structures-database.

As noted above, a concept structure is a reduced cluster of MMDEs together with their respective metadata, thus the DCC system 100 can generate a number of concept structures significantly smaller than the number of MMDEs. Therefore, the number of indices required in the concept DB 180 is significantly smaller relative to a solution that requires indexing of raw MMDEs.

For example, if one billion ($10^9$) MMDEs need to be checked for a match against another one billion MMDEs, typically the result is that no less than $10^9 \times 10^9 = 10^{18}$ matches have to take place, a daunting undertaking. The DCC system 100 would typically have around 10 million concept structures or less, and therefore at most only $2 \times 10^6 \times 10^9 = 2 \times 10^{15}$ comparisons need to take place, a mere 0.2% of the number of matches that have had to be made by other solutions. The number of generated indices is at most $2 \times 10^5$. As the number of concept structures grows significantly slower than the number of MMDEs, the advantages of the DCC system 100 would be apparent to one with ordinary skill in the art.

The operation of the PAP 110 will now be provided in greater detail with respect to a MMDE in a form of an image. However, this should not be understood as to limit the scope of the disclosed embodiments as other types of MMDEs are specifically included herein and may be handled by the PAP 110.

Figure 2:
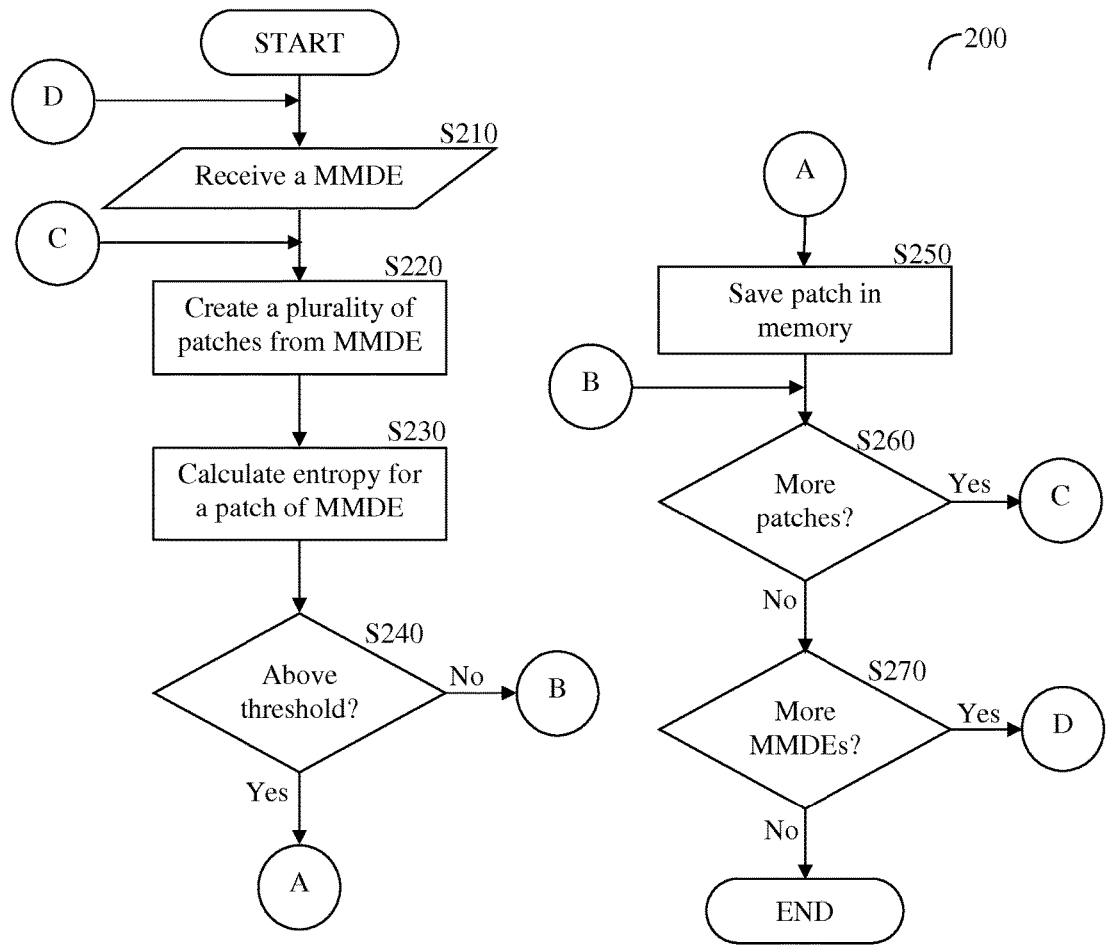
FIG. 2 is a flowchart illustrating the operation of the patch attention processor (PAP) in accordance with an embodiment.

FIG. 2 depicts an exemplary and non-limiting flowchart 200 of the operation of the PAP 110. In S210, the PAP 110 receives a MMDE from a source of MMDEs. Such a source may be a system that feeds the DCC system 100 with MMDEs or other sources for MMDEs, for example, the world-wide-web (WWW). In S220, the PAP 110 creates a plurality of patches from the MMDE. A patch of an image is defined by, for example, its size, scale, location and orientation. A patch may be, for example and without limitation, a portion of an image of a size, 20 pixels by 20 pixels, of an image that is 1,000 pixels by 500 pixels. In the case of audio, a patch may be a segment of audio 0.5 seconds in length from a 5 minute audio clip.

In S230, a patch not previously checked is processed to determine its entropy. The entropy is a measure of the amount of interesting information that may be present in the patch. For example, a continuous color of the patch has little interest, whereas sharp edges, corners or borders, will result in higher entropy representing a lot of interesting information. In one embodiment, a plurality of statistically independent cores, the operation of which is discussed in more detail herein below, is used to determine the level-of-interest of the image and a process of voting takes place to determine whether the patch is of interest or not.

In S240, it is checked whether the entropy was determined to be above a predefined threshold and, if so, execution continues with S250; otherwise, execution continues with S260. In S250, the patch having entropy above the threshold is stored for future use by the SG 120 in, for example, DB 150. In S260, it is checked whether there are more patches of the MMDE to be checked, and if so execution continues with S220; otherwise execution continues with S270. In S270, it is checked whether there are additional MMDEs, and if so execution continues with S210; otherwise, execution terminates. It would be appreciated by those of skill in the art that this process reduces the information that must be handled by the DCC system 100 by focusing on areas of interest in the MMDEs rather than on areas that are less meaningful for the formation of a concept structure.

Figure 3:
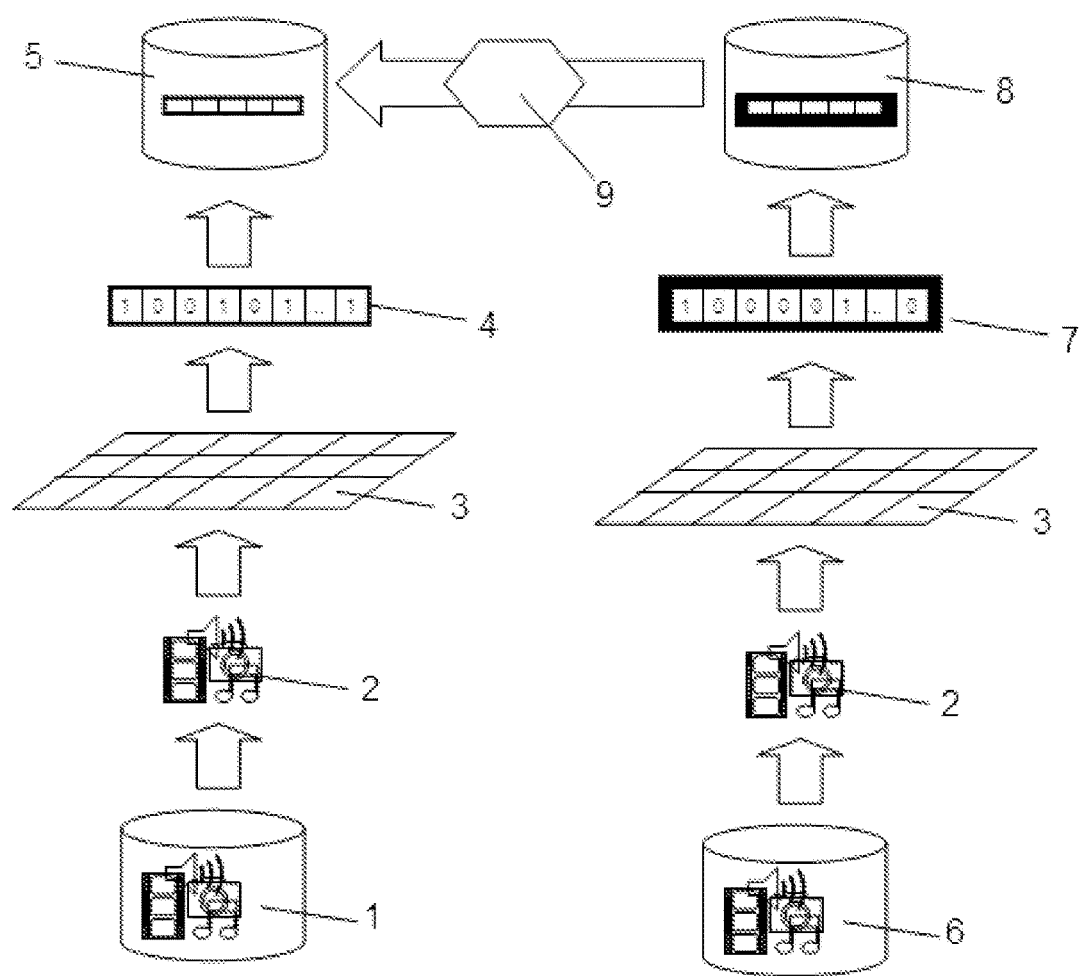
FIG. 3 is a block diagram depicting the basic flow of information in a large-scale video matching system.

A high-level description of the process for large scale video matching performed by a Matching System is depicted in FIG. 3. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Referring back to FIG. 3, at the final step, Target Robust Signatures and/or Signatures are effectively matched, by a matching algorithm 9, to Master Robust Signatures and/or Signatures database to find all matches between the two databases.

A brief description of the operation of the SG 120 is therefore provided, this time with respect to a MMDE which is a sound clip. However, this should not be understood as to limit the scope of the disclosed embodiments and other types of MMDEs that are specifically included herein and may be handled by the SG 120. To demonstrate an example of signature generation process, it is assumed, merely for the sake of simplicity and without limitation on the generality of the invention, that the signatures are based on a single frame, leading to certain simplification of the computational core's generation. The Matching System shown in FIG. 3 is extensible for signatures generation capturing the dynamics in-between the frames and the information of the frame's patches.

Figure 4:
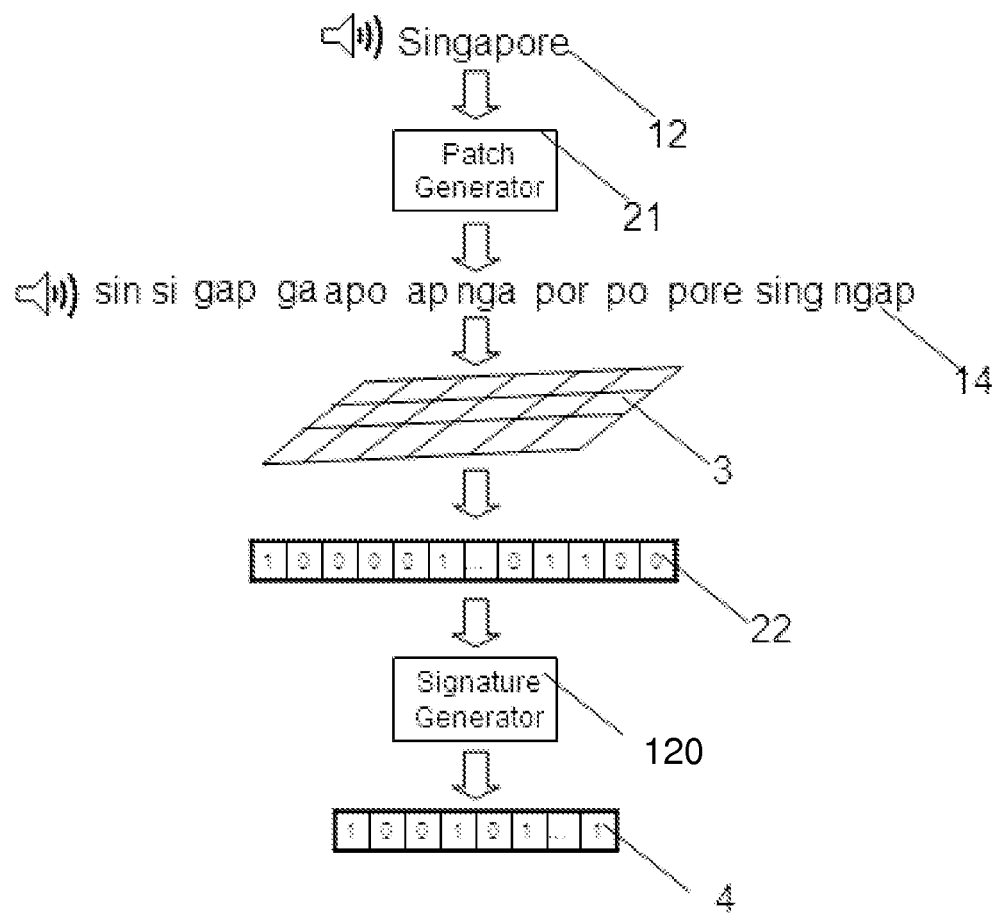
FIG. 4 is a diagram showing the flow of patches generation, response vector generation, and signature generation in a large-scale speech-to-text system.

The signatures generation process is now described with reference to FIG. 4. The first step in the process of signatures generation from a given speech-segment is to break-down the speech-segment into K patches 14 of random length P and random position within the speech segment 12. The break-down is performed by the patch generator component 21. The value of K is determined based on optimization, considering the tradeoff between accuracy rate and the number of fast matches required in the flow process of the System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The computational cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node $n_i$ equations are:

$$V_i = \sum_j w_{ij} k_j$$

$n_i = \theta(V_i - TH_x)$; $\theta$ is a Heaviside step function; $w_{ij}$ is a coupling node unit (CNU) between a node i and an image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature (ThS) and Robust Signature (ThRS) are set apart, after optimization, according to at least one or more of the following criteria:

I: For: $V_i > Th_{RS}$
   $1-p(V>Th_S)-1-(1-\epsilon)^l \ll 1$ i.e., given that I nodes (cores) constitute a Robust Signature of a certain image I, the probability that not all of these I nodes will belong to the Signature of same, but noisy image, $\tilde{I}$ is sufficiently low (according to a system's specified accuracy).

II: $p(V_i > Th_{RS}) \approx l/L$ i.e., approximately I out of the total L nodes can be found to generate Robust Signature according to the above definition.

III: Both Robust Signature and Signature are generated for a certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison to the original data. The detailed description of the Signature generation can be found U.S. Pat. Nos. 8,326,775 and 8,312,031, both assigned to common assignee, which are hereby incorporated by reference for all the useful information they contain.

Computational Core generation is a process of definition, selection and tuning of the Architecture parameters for a certain realization in a specific system and application. The process is based on several design considerations, such as: (a) The Cores should be designed so as to obtain maximal independence, i.e., the projection from a signal space should generate a maximal pair-wise distance between any two cores' projections into a high-dimensional space; (b) The Cores should be optimally designed for the type of signals they process, i.e. the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power, and, (c) The Cores should be optimally designed with regard to invariance to a set of signal distortions, of interest in relevant application.

Detailed description of the Computational Core generation and the process for configuring such cores is discussed in more detail in the above-referenced co-pending U.S. patent application Ser. No. 12/084,150.

According to certain embodiments, signatures are generated by the SG 120 responsive of patches received either from the PAP 110, or retrieved from the DB 150. It should be noted that other ways for generating signatures may also be used for the purpose the DCC system 100. Furthermore, as noted above, the array of cores may be used by the PAP 110 for the purpose of determining if a patch has an entropy level that is of interest for signature generation according to the principles of the invention. The generated signatures are stored, for example, in the DB 150, with reference to the MMDE and the patch for which it was generated thereby enabling back annotation as may be necessary.

Portions of the CP 130 have been discussed in detail in the co-pending U.S. patent application Ser. No. 12/507,489, entitled "Unsupervised Clustering of Multimedia Data Using a Large-Scale Matching System", filed Jul. 22, 2009, assigned to common assignee (the "'489 Application"), and which is hereby incorporated by reference for all that it contains. In accordance with an embodiment, an inter-match process and clustering thereof is utilized. The process can be performed on signatures provided by the SG 120. It should be noted that this inter-matching and clustering process is merely an example for the operation of the CP 130 and other inter-matching and/or clustering processes can also be utilized.

Following is a description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. Each cluster is represented by a small/compressed number of signatures, for example, signatures generated by the SG 120 as further explained hereinabove, which can be increased by variants. This results in a highly compressed representation of the content-universe. In certain implementations, a connection graph between the MMDEs of a cluster may be stored. The graph can then be used to assist a user searching for data to move along the graph in the search of a desired multimedia data element.

Upon determination of a cluster, a signature for the whole cluster may be generated based on the signatures of the multimedia data elements that belong to the cluster. It should be appreciated that using a Bloom filter may be used to reach such signatures. Furthermore, as the signatures generated by the SG 120 are correlated to some extent, the hash functions of the Bloom filter may be replaced by simpler pattern detectors, with the Bloom filter being the upper limit.

While signatures are used herein as the basic data elements, it should be realized that other data elements may be clustered using the system 100, for example, when a system generating data items is used, where the data items generated may be clustered according to the disclosed embodiments. Such data items may be, without limitation, multimedia data elements. The clustering process may be performed by dedicated hardware or by using a computing device having storage to store the data items generated by the system and then performing the process described herein above. Then, the clusters can be stored in memory for future use as may be deemed necessary.

The CP 130 further uses an engine designed to reduce the number of signatures used in a structure. This can be performed by extracting only the most meaningful signatures that identify the cluster uniquely. This can be done by testing a removal of a signature from a cluster and checking if the MMDEs associated with the cluster are still capable of being recognized by the cluster through signature matching. The process of signature extraction is on-going as the DCC system 100 operates. It should be noted that after initialization, upon signature generation by the SG 120 of a MMDE, its respective signature is first checked against the clusters to see if there is a match, and if so it may not be necessary to add the signature to the cluster or clusters, but rather by simply associating the MMDE with the identified cluster or clusters. However, in some cases where additional refinement of the concept structure is possible, the signature may be added, or at times even replace one or more of the existing signatures in the reduced cluster. If no match is found then the process of inter-matching and clustering may take place.

Figure 5:
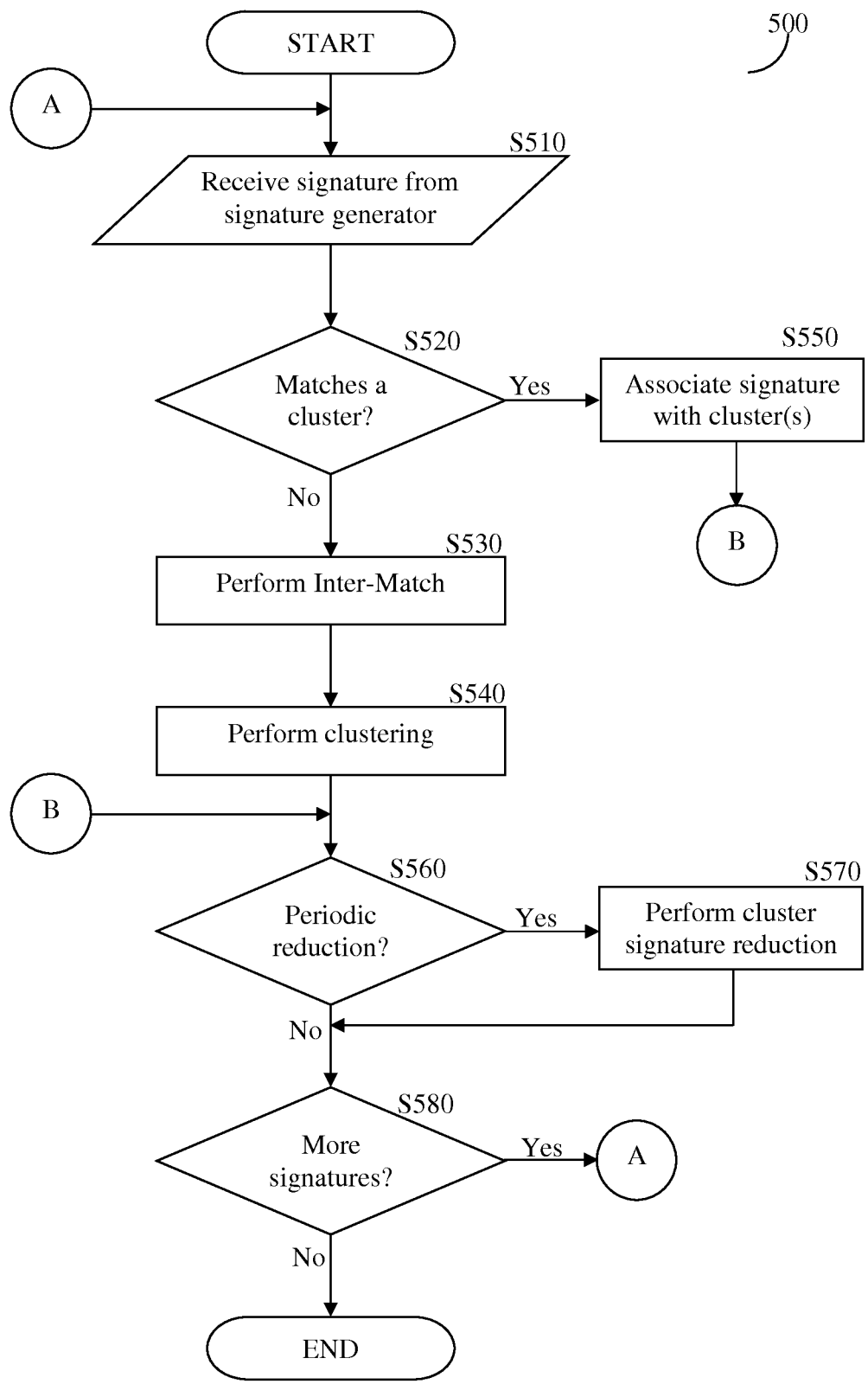
FIG. 5 is a flowchart illustrating the operation of the clustering processor in accordance with one embodiment.

FIG. 5 depicts an exemplary and non-limiting flowchart 500 of the operation of the CP 130. In S510, a signature of a MMDE is received, for example from the SG 120. In S520, it is checked whether the signature matches one or more existing clusters and, if so, execution continues with S550; otherwise, execution continues with S530. In S530, an inter-match between a plurality of signatures previously received by the DCC system 100 is performed, for example in accordance with the principles of the '489 Application. As may be necessary, the DB 150 may be used to store results or intermediate results as the case may be, however, other memory elements may also be used. In S540, a clustering process takes place, for example, as discussed in the '489 Application. As may be necessary, the DB 150 may be used to store results or intermediate results as the case may be, however, other memory elements may be used for this purpose as well.

In S550, the signature identified to match one or more clusters is associated with the existing cluster(s). In S560, it is checked whether a periodic cluster reduction is to be performed and, if so, execution continues with S570; otherwise, execution continues with S580. In S570, the cluster reduction process is performed. Specifically, the purpose of the operation is to ensure that in the cluster there remains the minimal number of signatures that still identify all of the MMDEs that are associated with the signature reduced cluster (SRC). This can be performed, for example, by attempting to match the signatures of each of the MMDEs associated with the SRC having one or more signatures removed there from. The process of cluster reduction for the purpose of generating SRCs is performed in parallel and independent of the process described herein above. In such a case after either S540 or S550, the operation of S580 takes place.

In S580, it is checked whether there are additional signatures to be processed and, if so, execution continues with S510; otherwise, execution terminates. SRCs may be stored in memory, such as the DB 150, for the purpose of being used by other elements of the DCC system 100.

The CG 140 performs two tasks: it associates metadata to the SRCs provided by the CP 130, and it associates between similar clusters based on commonality of metadata. Exemplary and non-limiting methods for associating metadata with MMDEs is described in the above-referenced U.S. patent application Ser. No. 12/348,888, entitled "Methods for Identifying Relevant Metadata for Multimedia Data of a Large-Scale Matching System", filed on Jan. 5, 2009, assigned to common assignee (the "'888 Application"), and which is hereby incorporated by reference for all that it contains. One embodiment of the '888 Application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 Application includes a system for collecting metadata for a first MMDE. The system comprises a plurality of computational cores enabled to receive the first MMDE, each core having properties statistically independent of each other core, each core generates responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generate a respective first signature of said first MMDE and/or a second signature of said first MMDE, for the purpose of determining a match with at least a second MMDE stored in the storage and associating metadata associated with at least the second MMDE with the first MMDE.

Similar processes to match metadata with a MMDE or signatures thereof can also be utilized, however, these should be viewed only as exemplary and non-limiting implementations, and other methods of operation may be used with respect to the DCC system 100 without departing from the scope of the invention. Accordingly, each SRC is associated with metadata which is the combination of the metadata associated with each of the signatures that are included in the respective SRC, preferably without repetition of metadata. A plurality of SRCs having metadata may now be associated to each other based on the metadata and/or partial match of signatures. For example, and without limitation, if the metadata of a first SRC and the metadata of a second SRC overlap more than a predetermined threshold level, for example by 50% of the metadata match, they may be considered associated clusters that form a concept structure. Similarly, a second threshold level can be used to determine if there is an association between two SRCs where at least a number of signatures above the second threshold are identified as a match with another SRC. For a practical example, one may want to consider the concept of Abraham Lincoln where images of the late President and features thereof, appear in a large variety of photographs, drawings, paintings, sculptures and more, and are associated as a concept structure of the concept "Abraham Lincoln". Each concept structure may then be stored in memory such as, for example, the DB 150, for further use.

Figure 6:
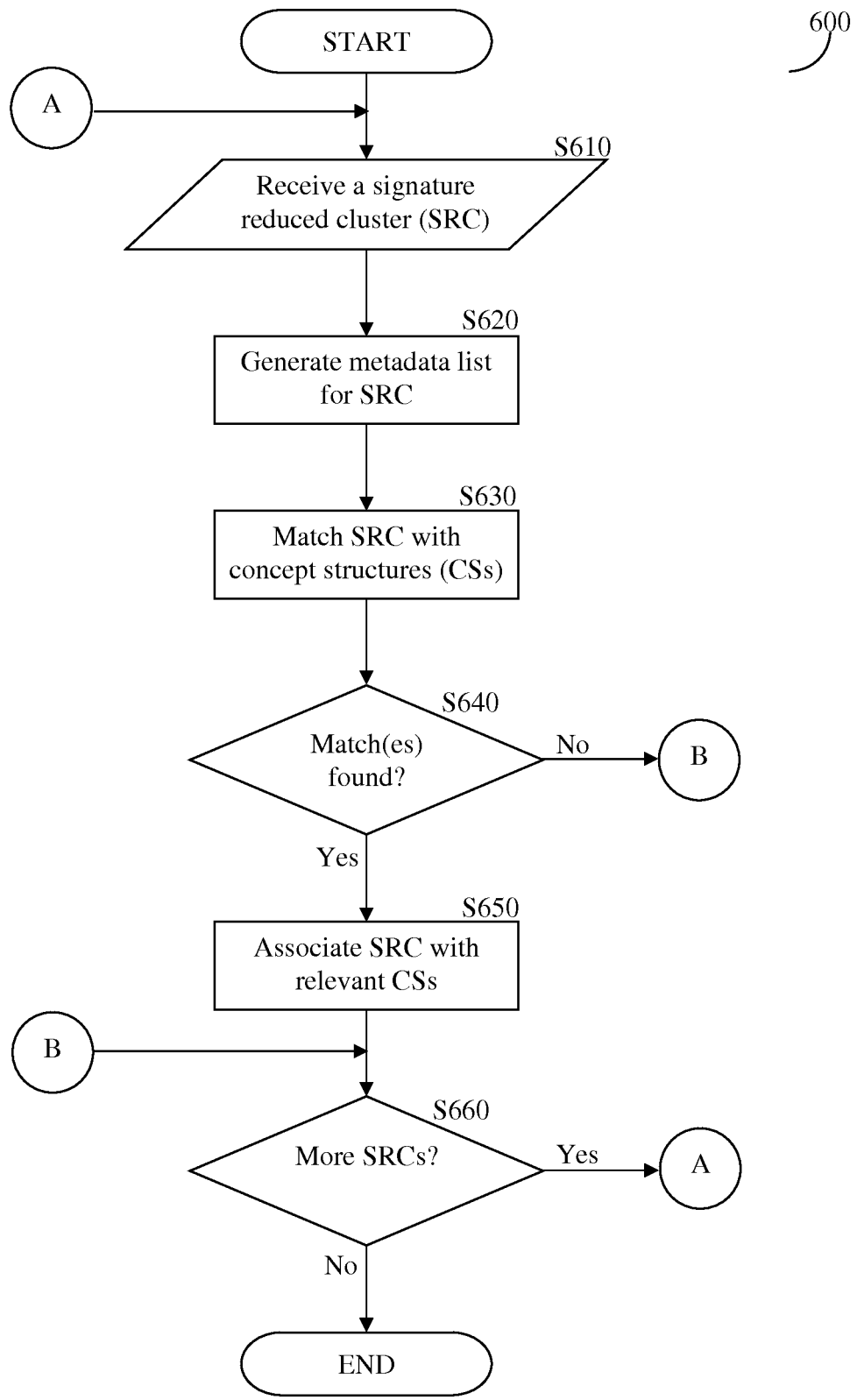
FIG. 6 is a flowchart illustrating the operation of the concept generator in accordance with one embodiment.

FIG. 6 shows an exemplary and non-limiting flowchart 600 of the operation of the CG 140. In S610, the CG 140 receives a SRC from either the CP 130 or by accessing, for example, the DB 150. In S620, metadata are generated for the signatures of the SRC. The process for generating metadata for the SRC is described in detail above. A list of the metadata is created for the SRC preferably with no metadata duplication. In one embodiment, the commonality of metadata is used to signify the strength of the metadata with respect to a signature and/or the SRC, i.e., a higher number of metadata repetitions is of more importance to the SRC than a lower number of repetitions. Furthermore, in one embodiment, a threshold may be used to remove those metadata that have a significantly low rate of repetition as not being representative of the SRC.

In S630, the SRC is matched to previously generated SRCs to attempt to find various matches as described, for example, hereinabove in more detail. In S640, it is checked if at least one match was found and if so, execution continues with S650; otherwise, execution continues with S660. In S650, the SRC is associated with one or more of the concept structures to which the SRC has been shown to match. In S660, it is checked whether additional SRCs are to be received, and if so execution continues with S610; otherwise, execution terminates.

A person skilled in the art should appreciate that the DCC system 100 creates automatically and in an unsupervised fashion concept structures of a wide variety of MMDEs. When checking a new MMDE, the MMDE may be checked against the concept structures stored, for example, in the DB 150 and the concept DB 180, and upon detection of a match, concept information about the MMDE may be provided. With the number of concept structures being significantly lower than the number of MMDEs, the solution is cost effective and scalable for the purpose of identification of content of a MMDE.

According to various embodiments disclosed herein, the concept structures are further utilized to index the MMDEs and, in particular, to, utilize each MMDE to a set of indices that are created based on mapping to the concept structures database. The indices of the MMDEs are stored in the DB 180, whereas the MMDEs can be deleted.

Figure 7:
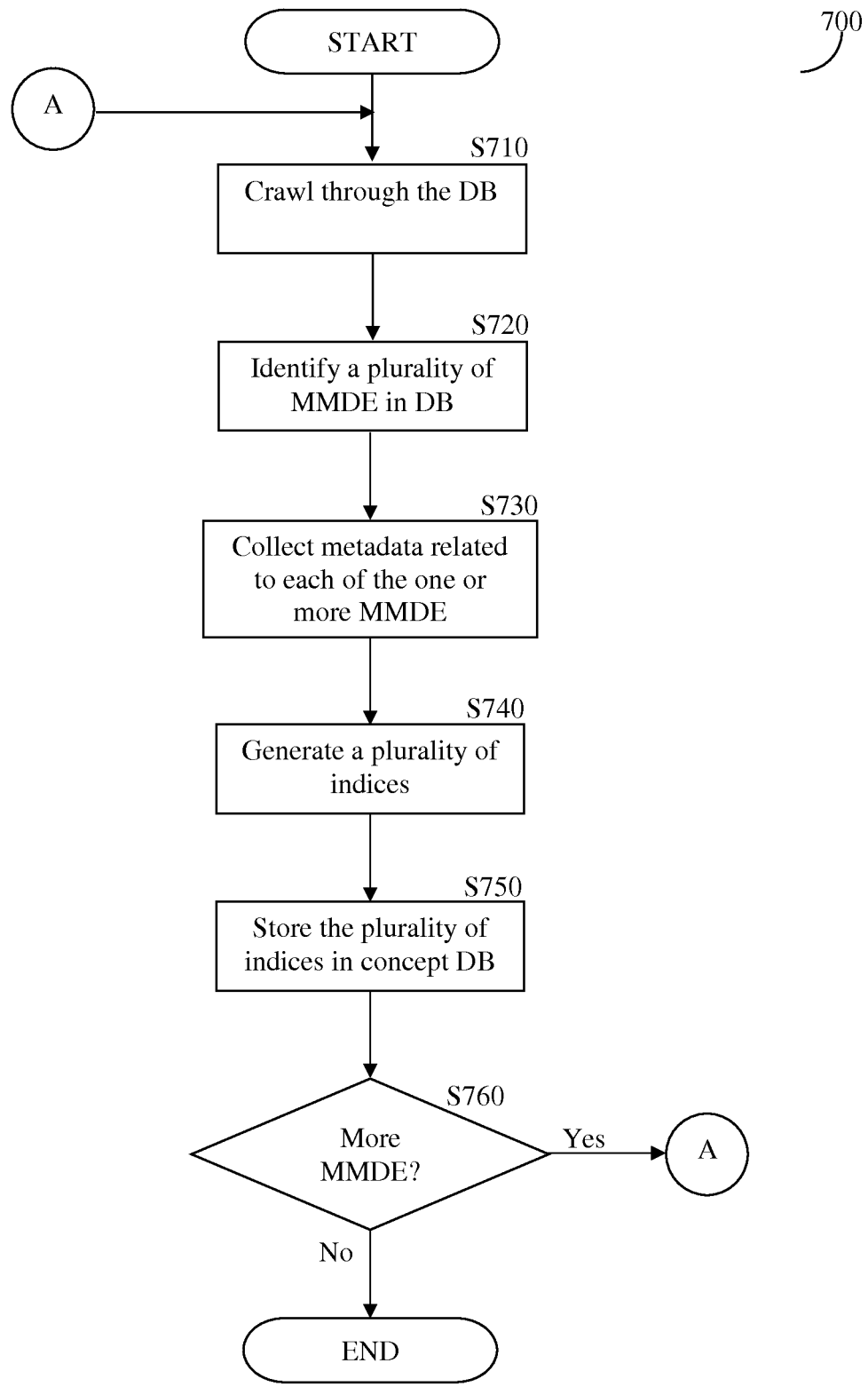
FIG. 7 is a flowchart illustrating a method for generating a concept database in accordance with one embodiment.

FIG. 7 shows an exemplary and non-limiting flowchart 700 of the operation of the IG 170 in accordance with one embodiment disclosed herein. In S710, the IG 170 crawls through the DB 150 to access and identify MMDEs stored therein or referenced therefrom. In S720, each of the identified MMDEs is marked as required for further processing. In S730, metadata respective of each of the identified MMDEs is collected. As noted above, the metadata may be in the form of the plurality of patches created by the PAP 110 from each MMDE, one or more signatures generated by the SG 120 respective of each MMDE, and the concept structure matched for each MMDE respective of the signatures of the MMDE. The metadata may be collected from such resources respectively.

In S740, using the collected metadata, the IG 170 generates a plurality of indices respective of each MMDE. In one embodiment, S740 includes matching the metadata of a MMDE against concept structures saved in the concept DB 180. For each matching concept structure, an index is generated for the MMDE. The index is a mapping of a MMDE to a matching concept structure.

In S750, the plurality of indices is stored in the concept DB 180 for future use. As noted above, the concept DB 180, in an embodiment, maintains the concept structures. In another embodiment, the concept structures are saved in DB 150 which may also include DB 180. The concept structures are generated by the CG 140 as discussed above. It should be noted that, if the metadata of the respective MMDE does not match any of the concept structures, a request is sent for the CG 140 to create a new structure; alternatively, an error message may be generated.

In S760, it is checked by the IG 170 whether there are additional MMDEs in the DB 150 and, if so, execution continues with S710; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for generating a concept database based on a plurality of multimedia data elements (MMDEs), comprising:
    an attention processor (AP) configured to generate a plurality of items from a received MMDE of the plurality of MMDEs and to determined which of the generated items are of interest for signature generation, wherein an item is of interest for signature generation if an entropy of the item is above a predefined threshold;
    a signature generator (SG) configured to generate at least one signature responsive to at least one item of interest of the received MMDE of the plurality of MMDEs;
    a clustering processor (CP) configured to cluster a plurality of signatures received from the signature generator responsive of the plurality of MMDEs and to create a signature reduced cluster (SRC);
    a concept generator (CG) configured to associate metadata with the SRC and to form a concept structure comprised of a plurality of previously generated SRCs, the created SRC, and their associated metadata, wherein the CG is further configured to:
    generate metadata for each of the created SRC,
    compare the generated metadata to metadata associated with each SRC of the plurality of previously generated SRCs to determine if there is a match, and
    associate the created SRC with the matching SRCs of the plurality of previously generated SRCs upon determining that there is a match; and
    an index generator (IG) configured to generate at least one index for mapping the received MMDE to the at least one concept structure formed by the CG, wherein the at least concept structures and the at least one generated index are stored in the concept database.

2. The system of claim 1, wherein the CG is further configured to:
    create a list of the generated metadata.

3. The system of claim 2, wherein the CG is further configured to:
    remove duplicated metadata of the list of the generated metadata.

4. The system of claim 2, wherein the CG is further configured to:
    determine a number of repetitions of each metadata of the list of the generated metadata.

5. The system of claim 4, wherein the CG is further configured to:
    compare the number of repetitions of a compared metadata of the list of the generated metadata to a threshold; and
    upon determining that the number of repetitions is below a threshold, remove all instances of the compared metadata from the list of the generated metadata.

6. The system of claim 4, wherein the CG is further configured to:
    determine a strength of each metadata of the list of the generated metadata based on each respective number of repetitions.

7. The system of claim 1, wherein the IG is further configured to:
    index the plurality of MMDEs based on the concept structure.

8. The system of claim 1, wherein the AP is a patch AP (PAP) that is configured to extract items in the form of patches from the received MMDE.

9. The system of claim 8, wherein the PAP is further configured to:
    determine which patches to provide for the signature generation based on at least one of: an entropy level of a patch, corners identified in a patch, and borders identified in a patch.

10. The system of claim 8, wherein the associated metadata is at least one of: a plurality of patches created by the PAP from each MMDE, the at least one signature generated by the SG to each MMDE, and the concept matched for each MMDE based on the signatures generated by the CP.

11. A method for generating a concept database based on a plurality of multimedia data elements (MMDEs) comprising:
- generating a plurality of items from a received MMDE of the plurality of MMDEs;
- determining the items that are of interest for signature generation, wherein an item is of interest for signature generation if an entropy of the item is above a predefined threshold;
- generating at least one signature responsive to at least one item of interest of the received MMDE of the plurality of MMDEs;
- clustering a plurality of signatures received from the signature generator responsive of the plurality of MMDEs;
- reducing the number of signatures in each cluster to create a signature reduced cluster (SRC) of the cluster;
- associating metadata with the SRC and forming a concept structure comprised of a plurality of previously generated SRCs, the created SRC, and their associated metadata, wherein the associating further comprises:
- generating metadata for each of the created SRC,
- comparing the generated metadata to metadata associated with each SRC of the plurality of previously generated SRCs to determine if there is a match, and
- upon determining that there is a match, associating the created SRC with the matching SRCs of the plurality of previously generated SRCs;
- generating at least one index for mapping the received MMDE to the at least one concept structure; and
- storing the at least one concept structure and the at least one generated index in the concept database.

12. The method of claim 11, further comprising:
creating a list of the generated metadata.

13. The method of claim 12, further comprising:
removing duplicated metadata of the list of the generated metadata.

14. The method of claim 12, further comprising:
determining a number of repetitions of each metadata of the list of the generated metadata.

15. The method of claim 14, further comprising:
- comparing the number of repetitions of a compared metadata of the list of the generated metadata to a threshold; and
- upon determining that the number of repetitions is below a threshold, removing all instances of the compared metadata from the list of the generated metadata.

16. The method of claim 14, further comprising:
determining a strength of each metadata of the list of the generated metadata based on each respective number of repetitions.

17. The method of claim 11, further comprising:
indexing the plurality of MMDEs based on the concept structure.

18. The method of claim 11, wherein the AP is a patch AP (PAP) that is configured to extract items in the form of patches from the received MMDE.

19. The method of claim 18, wherein the PAP is further configured to:
determine which patches to provide for the signature generation based on at least one of: an entropy level of a patch, corners identified in a patch, and borders identified in a patch.

20. The method of claim 18, wherein the associated metadata is at least one of: a plurality of patches created by the PAP from each MMDE, the at least one signature generated by the SG to each MMDE, and the concept matched for each MMDE based on the signatures generated by the CP.

21. A non-transitory computer readable medium having stored thereon instructions for causing one or more processing units to execute the method according to claim 11.

* * * * *